United States Patent Office 3,158,071
Patented Nov. 24, 1964

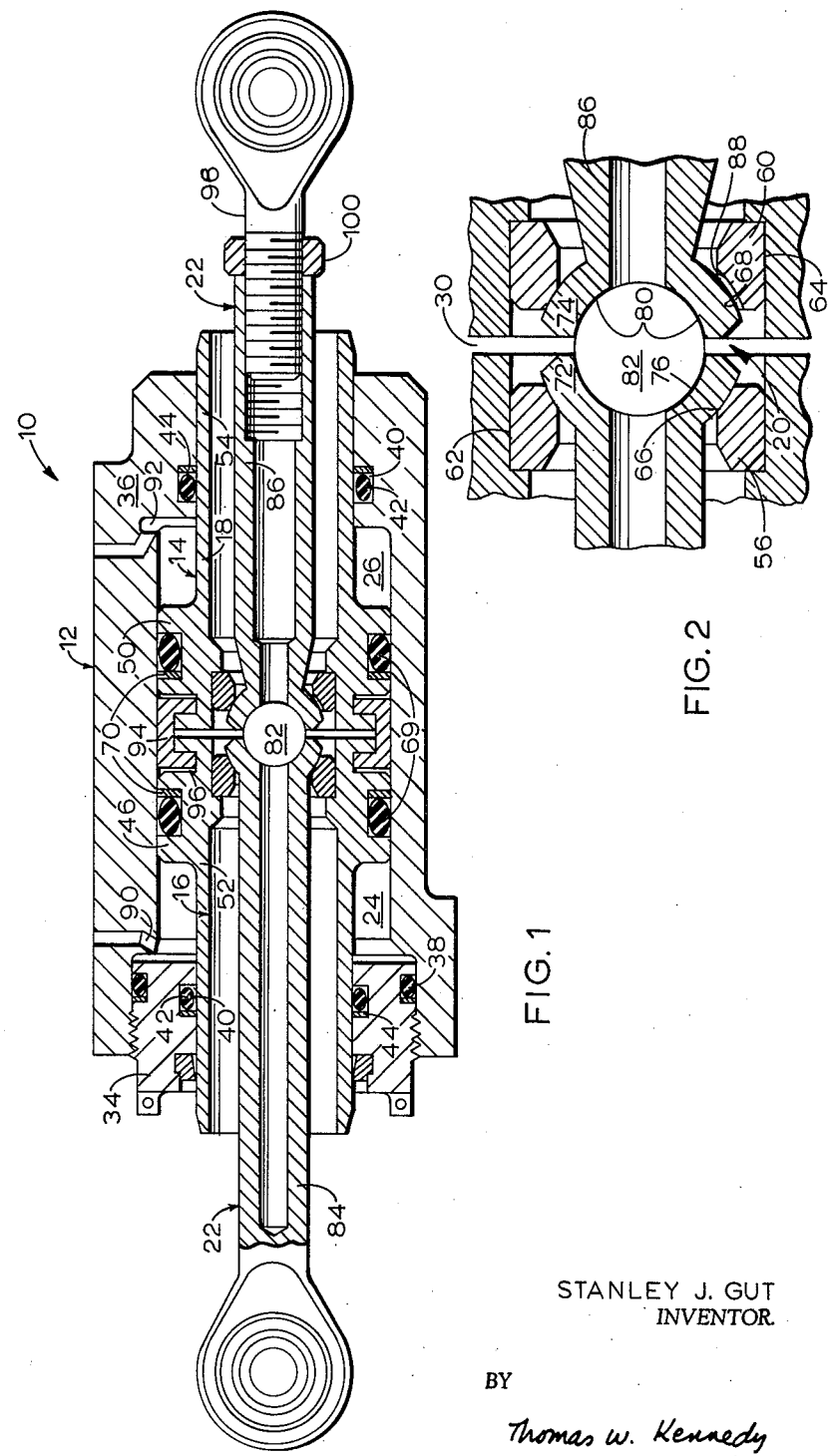

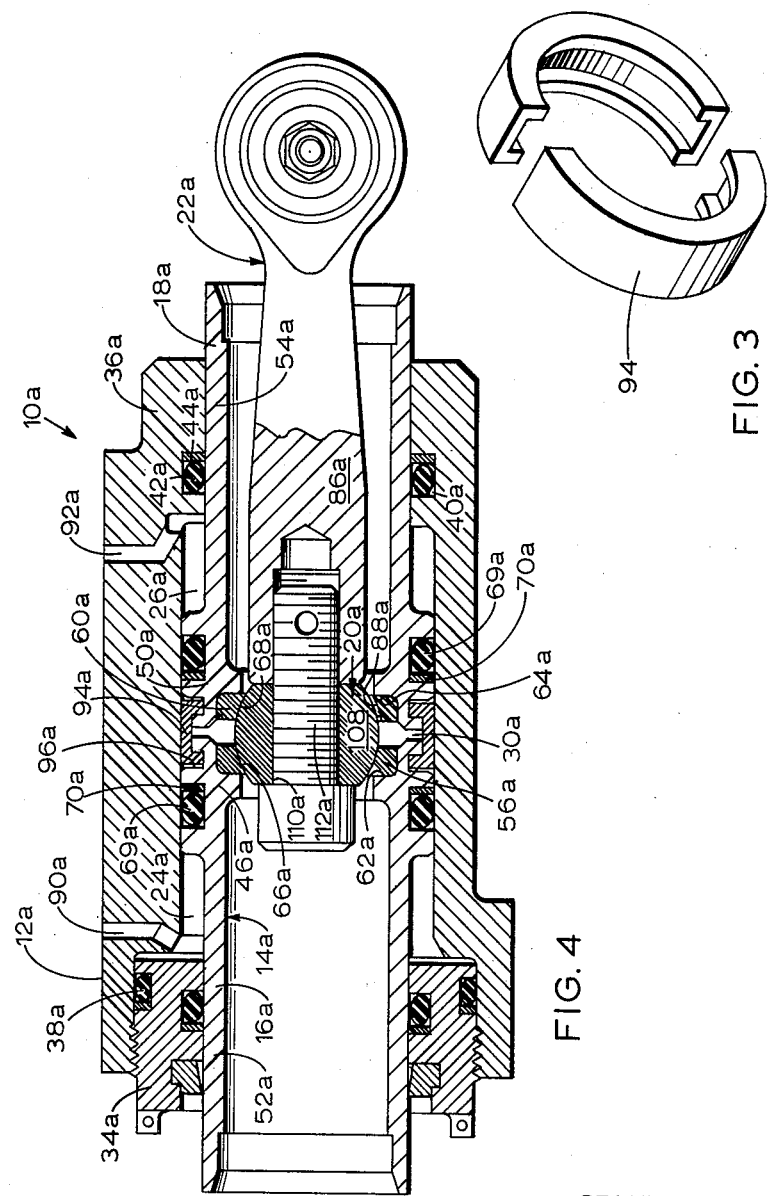

3,158,071
HYDRAULIC ACTUATOR FITTED WITH
PIVOTED JOINT
Stanley J. Gut, Passaic County, N.J., assignor to General
Precision Inc., Little Falls, N.J., a corporation of
Delaware
Filed Aug. 15, 1963, Ser. No. 302,382
7 Claims. (Cl. 92—109)

This application is a continuation-in-part of application Serial No. 56,890, filed September 19, 1960, for Hydraulic Actuator Fitted With Pivoted Joint.

The present invention relates to hydraulic actuators, and particularly to hydraulic actuators having a thrust link pivotally connected to a piston reciprocatable in a cylinder.

In a conventional fluid motor, comprising a piston and cylinder and a connecting rod joined to the piston by a wrist pin, due to wearing of the adjacent bearing surfaces of the wrist pin and connecting rod, when the piston reverses, there is a lost motion in the piston rod which is termed backlash. In prior double-acting hydraulic actuators, there is similar wear at the pivoted end of the thrust link, in the adjacent bearing surfaces of the thrust link and the piston connecting means, which results in a similar type of backlash. Although this backlash has been greatly minimized in hydraulic actuators by preventing wear of the said bearing surfaces, there are some high performance installations which cannot tolerate even a slight backlash effect.

In accordance with one embodiment of the present invention, a hydraulic actuator comprises a fixedly mounted cylinder and a pair of hollow piston sections disposed therein and in spaced relation, and having a pair of bearing surfaces facing each other. A pair of thrust links extend from outside the cylinder through the hollow piston sections and are mounted at their inner ends on a pivotal bearing means which is clinched between the piston bearing surfaces. In such an arrangement, the pair of piston sections divide the cylinder into a pair of sealed variable-volume working chambers with a sealed space between said piston sections. The differential pressure between chambers displaces the pair of piston sections in unison relative to the cylinder. The pressure in the chambers, being larger than in the intermediate space, urges the piston sections toward each other and maintains a continuous bearing pressure on both sides of the pivotal bearing means supporting the thrust links. Accordingly, any wearing of the bearing surfaces on the pivotal bearing means and the bearing surfaces on the piston sections, which are in engagement with each other, will be taken up immediately by a slight reduction in the space between the piston sections whereby even a slight backlash is avoided.

Accordingly, it is one object of the invention to eliminate thrust link backlash or lost motion in a double-acting hydraulic actuator.

It is another object of the invention to eliminate piston seal ring backlash or lost motion in a double-acting hydraulic actuator.

A further object of the invention is to prevent the introduction of backlash by wear of the parts in a double-acting hydraulic actuator.

Further objects and advantages of the present invention will become readily apparent upon reading the following detailed description of a specific embodiment of the invention and when taken in conjunction with the drawings, wherein;

FIGURE 1 is a sectional view of a hydraulic actuator embodying features of the present invention;

FIGURE 2 is an enlarged detail of a portion of FIGURE 1;

FIGURE 3 is a perspective view of a part used in the hydraulic actuator of FIGURE 1; and FIGURE 4 is a sectional view of a hydraulic actuator illustrating a modification of the present invention.

Referring to FIGURES 1 and 2, one embodiment of the present invention is a hydraulic actuator 10 comprising an outer body 12 having a cavity, and an inner body or piston 14 disposed in said cavity. The inner body 14 has a first hollow piston section 16 and a second hollow piston section 18, having pivotal bearing means 20 therebetween, on which is mounted a pair of thrust links 22. Each said piston section 16 and 18 engages the inner surface of the outer body 12 to form an intermediate space 30 between said piston sections and to form a pair of variable-volume working chambers 24, 26. Each of said working chambers is supplied with fluid through ports in the outer body 12 and said intermediate space 30 is vented to the atmosphere by passage means, as explained hereafter. Fluid pressures in said working chambers 24, 26 displace said piston sections relative to said outer body 12 and also prevent a separation of said piston sections 16 and 18. Pivotal bearing means 20 is disposed in the space 30 between piston sections 16 and 18 and is clamped between the piston sections. Said pair of thrust links 22 are separately disposed inside said hollow piston sections 16 and 18. Each thrust link 22 is mounted on a separate portion of said pivotal bearing means 20 and the pair of thrust links 22 extend axially outwardly in opposite directions from said outer body 12.

The outer body 12 is preferably a cylindrical body, and has annular end caps 34, 36, one of which 34 may be screw-threaded thereto, and the other of which 36 may be integral therewith. Each of said end caps 34, 36 is provided on its inner surface with an annular interior groove 40, which receives an interior O-ring seal 42 and an annular anti-extrusion ring 44. Each of said interior seals 42 prevents leakage across its surface and through its joint, thereby helping to seal the cavity of said outer body 12. The exterior surface of the removable cap 34 has an annular exterior groove and an exterior O-ring seal 38 to prevent leakage across its surface and through its joint thereby also helping to seal the cavity of the outer body 12.

First and second hollow piston sections 16, 18 have separate piston heads 46, 50, and each having an outwardly extending hollow piston rod 52, 54. Piston rods 52, 54 pass through end caps 34, 36 and are in sealing engagement with the interior O-rings 42 therein. A pair of bearing members 56, 60, separated by a space which forms a portion of said intermediate space 30, are carried coaxially in said piston sections 16, 18. Bearing member 56, having a spherical seat 66, is seated in an internal counterbore 62 in the piston section 16 and bearing member 60, having a spherical seat 68, is seated in an internal counterbore 64 in the other piston section 18. The pair of bearing members 56, 60 are preferably identical rings, with each said ring being made in two halves to facilitate assembly over its thrust link 22. On the exterior surface of each piston head 46, 50 is a coaxial annular groove, which receives a seal ring 69 and an anti-extrusion ring 70 adjacent to the seal ring. Seal rings 69 on said piston sections 16, 18 prevent leakage from the working chambers into the intermediate space 30 therebetween. The action of the sealing members will be discussed in more detail hereafter.

A pivotal bearing means 20 is disposed in said space between said piston bearing members 56, 60 and engages their spherical seats 66, 68. The pivotal bearing assembly 20 comprises outer pivot bearings 72, 74, which are preferably identical frustums or segments of a hollow sphere, and a pivot sphere 82 disposed between the outer pivot bearings. Pivot bearing 72 has an outer surface engaging the spherical seat 66 of the piston bearing member 56 and has an interior spherical seat 76 engaging sphere 82 so that said outer pivot bearing 72 can rotate relative to the piston bearing member 56 and relative to pivot sphere 82. The second outer pivot bearing 74 also has an outer surface engaging the spherical seat 68 of the other said piston bearing member 60 and has an interior spherical seat 80 engaging said pivot sphere 82 so that said second outer pivot bearing 74 can rotate relative to said second piston bearing member 60 and relative to said pivot sphere 82. Preferably, there is a substantially common radial center to said spherical surfaces of said outer pivot sphere 82, said spherical seats 76, 80 in said outer pivot bearings 72, 74 and said spherical seats 66, 68 of said piston bearing members 56, 60.

Thrust links 22 comprise a hollow link 84 and a hollow link 86. Link 84 is fixedly mounted on the outer surface of pivotal outer bearing 72, and link 86 is similarly mounted on said second pivotal outer bearing 74, whereby each thrust link can independently rotate relative to the other and relative to the piston sections 16, 18. In FIGURE 1, each said thrust link 84, 86 is shown in cross-section and its respective outer pivot bearing 72, 74 is shown as an integral part of said thrust link, and this is the preferred construction. The exterior diameters of the thrust link 84, 86 are less than the internal diameters of the hollow piston rods 52, 54, and the thrust links 84, 86 may therefore move within these hollow piston rods to cause arcuate movements of appropriate linkages to which the outer ends of the thrust links 84, 86 are connected.

Working chambers 24, 26 are each provided with a port 90, 92 respectively, each said port preferably being a combination intake and exhaust port. The ports 90, 92 are connected with means (not shown) disposed outside said fixed outer body 12, which supply and exhaust fluid to the working chambers 24, 26 for reversible displacement of said inner body 14.

The intermediate space 30 is formed or bounded by a portion of the inner surface of the outer body 12, by the adjacent end faces of the piston heads 46, 50, by the axially inner faces of the piston bearing members 56, 60, and by adjacent surface portions of the outer pivot bearings 72, 74. As mentioned before, this intermediate space 30 is sealed off from the working chambers 24, 26 by the seal rings 69. The intermediate space 30 also communicates with the atmosphere through the annular space formed inside each hollow piston between the inner surface of the hollow piston rod 52, 54 and the outer surface of each adjacent thrust link 84, 86. The intermediate space 30 normally communicates with said annular space inside each said hollow piston rod 52, 54 through a gap formed between the radially outer surface of each piston bearing member 56, 60 and the radially inner surface of its piston section 16, 18, and through the crevices between the bearing surfaces around the axially outer faces of said piston bearing members 56, 60. To further assure the venting of space 30 at least one of the bearing members 60 may have at least one vent groove 88 forming a passage between space 30 on one of its sides to the open hollow space inside its piston rod on its other side, the groove being on the inner surface of the bearing member 60. Thus, the pressure in the intermediate space 30 is normally at atmospheric pressure and is always lower than the pressure in the working chambers.

As shown in FIGURES 1 and 3, each of the piston heads 46, 50 has on its exterior surface and adjacent to its inner edge, an annular groove 96, which receives a keeper 94, a ring-shaped member having a U-shaped transverse section, with the flanges of said transverse U-shaped section pointing radially inwardly. Each flange of said keeper 94 engages and is received in one of the annular grooves 96 in order to facilitate the assembly of the pair of hollow piston sections 16, 18 within the outer body 12. Of necessity, keeper 94 is made in two pieces or halves for assembly in their annular grooves 96. Inasmuch as keeper grooves 96 are disposed between the grooves for piston seal rings 69 when the pistons are assembled, they form a portion of intermediate space 30, and are similarly vented to the atmosphere.

Each of the flanges of the keeper 94 is separated on each of its sides by a gap from the adjacent sidewalls of its groove 96 to assure that the keeper 94 is never clamped by the piston heads 46a, 50a. The sole purpose of the keeper 94 is, therefore, to facilitate assembly of the piston sections 16, 18 within the outer body 12.

Because the pressure is always larger in the working chambers 24, 26 than in the intermediate space 30, the piston sections 16, 18 are urged toward each other and maintain a continuous bearing pressure on both sides of the pivotal bearing means 20. After continuous operation, if there is a wearing of one of a pair of adjoining surfaces which are in engagement, such as the outer surface of the sphere 82 and the spherical seats 76, 80 of the outer pivot bearings or outer surface of the outer pivot bearings 72, 74 and the spherical seats 66, 68 of bearing members 56, 60, a slight gap would be created in the prior art type of hydraulic actuator. In actuators embodying the present invention such a gap cannot be formed because any clearance finding its way into the assembly is immediately and automatically taken up as the piston sections 16, 18 move toward each other, accompanied by a slight reduction in the intermediate space 30 between the piston sections 16, 18; thus, even a slight backlash or lost motion in either thrust link 84, 86 is avoided. While the gap causing backlash in the prior art actuators is most likely due to wearing, as mentioned, said gap may also in part be due to an elastic distortion of the pivotal bearing means 20, or like causes, and, in such event, said gap in accordance with this invention is eliminated and any backlash or lost motion is avoided in its entirety.

As mentioned before, the various sealing members, including the piston seal rings 69, the cap interior O-rings 42 and the cap exterior O-rings 38 assure that each said working chamber 24, 26 is substantially leak-proof. To assure good sealing, said anti-extrusion rings 70, which engage the piston seal rings 69, are disposed on the axially inner sides of said seal rings 69. In this way, anti-extrusion rings 70 reduce the tendency of the outer portion of said seal rings 69 to be pressed or extruded into the annular area between the inner surface of the outer body 12 and the piston head 46, 50. This provides a more positive sealing between said O-rings and the outer body, as it reduces the tendency of the hydraulic fluid to be blown through narrow gaps or crevices, which may have been formed in an extruded type of O-ring.

In addition, backlash or lost motion in the piston seal rings 69 is eliminated because the pressure drop across each seal ring 69 is always directed axially inwardly, so that each said seal ring 69 is always urged against its adjacent anti-extrusion ring 70 which in turn is urged against the adjacent, axially-inner sidewall of its groove. Therefore, each said seal ring 69 is prevented from moving back and forth in its groove as its piston section 16 or 18 moves back and forth within the cylinder 12. With this construction, said piston seal rings 69 are always pre-loaded against the inner walls of their annular grooves, to eliminate the possibility of pressurized fluid being introduced into one end or the other of the cylinder 12 without immediate movement of the inner body 14. For example, when pressurized fluid is introduced into the outer body 12 through the port 90, it urges the seal ring 69 in the piston section 16 against its axially-inner groove sidewall to the right and shifts the piston section 16 and the rest of the inner body 14 to the right. At the same time, the back pressure created by the fluid being forced out through the port 92 and working chamber 26 urges the piston seal ring 69 and the piston section 18 against its axially-inner groove sidewall. This eliminates the possibility of a flow of fluid to the outer body 12 unaccompanied by piston or inner body motion as will occur, for example, if the piston seal ring 69 were not in engagement with the axially-inner groove sidewall and a pressurized fluid had to first shift the seal ring into engagement with said sidewall before beginning to move the inner body 14. Thus, backlash is prevented in the seal rings 69 of said piston sections 16, 18 as discussed above, and also independently prevented in the pivotal bearing means 20 of said thrust links 22 as discussed heretofore.

In a typical installation using said hydraulic actuator 10, the axially outer ends of the thrust links 22 are normally connected to crank arms (not shown) of devices (not shown) to be driven by the hydraulic actuator 10, the connection being by pivot pins (not shown), said pivot pins describing an arc when they are moved. In operation, the admission of hydraulic fluid through either the first port 90 or the second port 92 will cause the inner body 14, including the piston sections 16, 18 and the pivotal bearing means 20, and thrust links 22, to move to the right or left, as the case may be, to thereby rotate the crank arms (not shown) through the urgency of said thrust links 22. In this way, the actuated devices (not shown) move in a rotational movement. The thrust links 22 normally move in unison longitudinally, and also have an independent rotational angular relation about the center of the pivotal bearing means 20 within the inner body 14. In addition, it will be noted that one of said thrust links 22 has on its axially outer end an adjustable thrust link, comprising an externally threaded rod end 98 and a lock nut 100 for ease of assembly of the hydraulic actuator 10 with said crank arms (not shown).

With this type of hydraulic actuator 10, because each thrust link 22 can rotate independently about the pivotal means 20 and because the two piston heads 46, 50 are unconnected and separated, there is more longitudinal flexibility of its inner body or piston 14 than is found in similar types of prior art hydraulic actuators, and this minimizes working stresses in its parts.

For example, not only is there no bending moment transmitted from one thrust link 84 to the other thrust link 86, but also there is no bending moment transmitted from one piston rod 52 to the other piston rod 54, which minimizes stress in the piston rods 52, 54, as well as in other parts such as the sealing members 42, 69 particularly during extended operation of the hydraulic actuator 10.

The hydraulic actuator 10, in accordance with the present invention, as illustrated in FIGURE 1, is particularly useful in present-day equipment applications, for example in the adjustment of aircraft controls, high-resolution radar antenna, etc., wherein the backlash or lost motion in a hydraulic actuator must be practically nil, and in addition, wherein a single hydraulic actuator frequently must be arranged between a pair of actuated devices to operate said devices in a prescribed manner.

Referring to FIGURE 4, another embodiment of the present invention is illustrated, in which the hydraulic actuator has only a single thrust link instead of a pair of thrust links as in the embodiment in FIGURE 1, and has a simplified, one-piece pivotal bearing means on which the single thrust link is mounted, instead of a multi-piece pivotal bearing means, but which is clamped between a pair of pistons similar to the FIGURE 1 embodiment. For ease of understanding, the parts of FIGURE 4 corresponding to the parts of FIGURES 1, 2 and 3 have been designated by the same reference numerals but with a subscript "a" added thereto.

The second embodiment of the present invention is a hydraulic actuator 10a comprising an outer body 12a having a cavity, and an inner body 14a disposed in said cavity. The inner body or piston 14a has a first hollow piston section 16a and a second hollow piston section 18a, having pivotal bearing means 20a therebetween, on which is mounted a single thrust link 22a. Each of said piston sections 16a, 18a engages the inner surface of the outer body 12a to form an intermediate space 30a between said piston sections and to form a pair of variable-volume working chambers 24a, 26a. Each of said working chambers is supplied with fluid through ports 90a, 92a in the outer body 12a, and said intermediate space 30a is vented through vent groove 88a to the atmosphere. Fluid pressures in said working chambers 24a, 26a displace said piston sections in unison relative to said outer body 12a, prevent a separation of said piston sections 16a, 18a, and urge them toward each other. Said pivotal bearing means 20a is disposed in the space 30a between said piston sections 16a and 18a and is clamped between said piston sections. A single thrust link 22a is disposed inside one of said hollow piston sections 18a. The single thrust link 22a is fixedly mounted on an adjacent portion of said pivotal bearing means 20a and it extends axially outwardly from one end of said outer body 12a.

The outer body 12a is preferably a cylindrical body, and has annular end caps 34a, 36a, one of which 34a may be screw-threaded thereto, and the other of which 36a may be integral therewith. Each of said end caps 34a, 36a is provided with O-ring seals 42a to seal the cavity of the outer body 12a. A pair of bearing members 56a, 60a having spherical seats 66a, 68a, are seated in respective internal counterbores 62a, 64a in their respective piston sections 16a, 18a. Those features, as explained thus far, which are present in the two embodiments of FIGURES 1 and 4, are similar in construction.

In FIGURE 4, said pivotal bearing means 20a is disposed between said piston bearing members 56a, 60a and engages their spherical seats 66a, 68a. Said pivotal bearing means 20a is a one-piece construction, preferably a sphere 108, so that its construction is much simpler than its counterpart in the FIGURE 1 embodiment. Said sphere 108 has an outer surface engaging the spherical seat 66a of the piston bearing member 56a and has on its other side a second outer surface portion engaging the spherical seat 68a of the other piston bearing member 60a so that the sphere 108 can be rotated relative to said piston bearing members 56a, 60a, while being clamped between the bearing members 56a, 60a of said respective piston sections 16a, 18a.

Said thrust link 22a is fixedly mounted on the outer surface of said sphere 108, preferably by suitable connecting means, such as a bolt 112, or the like, extending through a bore 110 in said sphere 108, which is screw-threaded into the axially inner end of said thrust link 22a. Thus, said thrust link 22a rotates together with said sphere 108 relative to said bearing members 56a, 60a of the piston sections 16a, 18a. With a pivotal bearing means 20a of a one-piece type of construction, manufacture of the hydraulic actuator 10a is greatly simplified. In addition, the pivotal bearing means 20a can be made either integral with its thrust link 22a, or made separate from its thrust link 22a, whichever is better suited to the application wherein the actuator 10a is used. With such a single-link type of actuator 10a, it is obvious that the pivotal bearing means 20a, can be offset nearer to the axially outer end of its hollow piston rod 54a, if desired, and in this way, said thrust link 22a can rotate about its pivotal bearing means 20a through a longer arc, than if symmetrically disposed mid-way between the piston heads 46, 50.

In a typical installation using this second embodiment of a hydraulic actuator 10a in accordance with the invention, the hydraulic actuator 10a can be employed to swivel a weighty structure (not shown) about its hinged mount. In operation, the admission of hydraulic fluid through either the first port 90a or through the second port 92a will cause the inner body 14a, to move to the right or left as the case may be, to thereby rotate the actuated structure through the agency of its single thrust link 22a. The hydraulic actuator 10a can be fixedly mounted, while the actuated structure is moved in said rotational movement. Thus, this type of hydraulic actuator 10a with a single thrust link 22a is particularly useful for actuating such a weighty structure where there must not be the slightest backlash within the hydraulic actuator 10a. Said hydraulic actuator 10a of the second embodiment has the same advantages as the fisrt embodiment in accordance with the invention, namely, that backlash is not only prevented in the seal rings 69a of the piston sections 16a, 18a, but also separately and independently prevented in the pivotal bearing means 20a of said single thrust link 22a, particularly after the parts are well-worn.

While the present invention has been described in detail in its present preferred embodiments it will be obvious to those skilled in the art after understanding this invention that various changes and modifications may be made therein without departing from the spirit or scope thereof. It is intended by the appended claims to cover all such modifications.

What is claimed is:

1. A hydraulic actuator comprising:
   a cylinder;
   a piston made of two hollow piston sections disposed in said cylinder and dividing said cylinder into two variable-volume working chambers for longitudinal displacement in unison relative thereto and forming a space therebetween for automatic take-up movement toward each other;
   first means defining a coaxial, annular internal bearing surface in the interior of said first piston section, second means defining a similar coaxial, annular internal bearing surface in the interior of said second piston section;
   a backlash-free pivotal bearing means clamped between said first and second piston sections, and rotatable relative thereto, having a first portion defining an annular external bearing surface which engages said internal bearing surface of said first piston, and having a second portion defining an annular external bearing surface which engages said internal bearing surface of said second piston, said external surfaces in said portions of said pivotal bearing means being dual-base spherical segments of substantially equal radius with a common center; and
   at least one thrust link mounted on one of said portions of said pivotal bearing means and extending through one of said hollow piston sections.

2. A hydraulic actuator as claimed in claim 1 and in which said pivotal bearing means is a sphere of one-piece construction.

3. A hydraulic actuator as claimed in claim 1 and in which the pivotal bearing means is a three-piece construction comprising a first outer pivot bearing portion and an identical second outer pivot bearing portion, and a pivot sphere disposed between said identical outer pivot bearing portions with each pivot bearing portion having an interior spherical seat engaging said pivot sphere, the interior surfaces of said interior spherical seats and the outer surface of said pivot sphere having substantially the same radius with a common center.

4. A hydraulic actuator as claimed in claim 1 and in which said thrust link is integral with its adjoining portion of said pivotal bearing means.

5. A hydraulic actuator as claimed in claim 1 and including passage means in one of said hollow piston sections communicating with said intermediate space for venting said intermediate space.

6. A hydraulic actuator as claimed in claim 1 and in which each said piston section has an annular groove receiving a backlash-free seal ring for sealing its adjacent working chamber from said space between said pistons.

7. A hydraulic actuator comprising:
   a cylinder;
   a piston made of two portions disposed in said cylinder and dividing said cylinder into two variable-volume working chambers for longitudinal displacement in unison relative thereto and forming a space therebetween for automatic take-up movement toward each other, at least one of said portions being a hollow piston portion;
   first means defining a coaxial, annular internal bearing surface disposed adjacent one of said piston portions, second means defining a similar coaxial, annular internal bearing surface disposed adjacent the other of said piston portions;
   a backlash-free pivotal bearing means, clamped between said piston portions and rotatable relative thereto, having a first pivot portion defining an annular external bearing surface which engages said internal bearing surface of one piston portion, and having a second pivot portion defining an annular external bearing surface which engages said internal bearing surface of said other piston portion, said external surfaces in said pivot portions of said pivotal bearing means being dual-base spherical segments of substantially equal radius with a common center; and
   at least one thrust link mounted on one of said pivot portions of said pivotal bearing means and extending through said hollow piston portion.

References Cited by the Examiner

UNITED STATES PATENTS

| | | | |
|---|---|---|---|
| 359,827 | 3/87 | White | 287—91 |
| 2,466,243 | 4/49 | Johnson | 287—61 |
| 3,066,001 | 11/62 | Zimmerman | 92—257 |

RICHARD B. WILKINSON, *Primary Examiner.*

KARL J. ALBRECHT, *Examiner.*